Oct. 17, 1944.  J. W. FRENCH  2,360,768
GUN SIGHT
Filed June 9, 1941
FIG: 1.
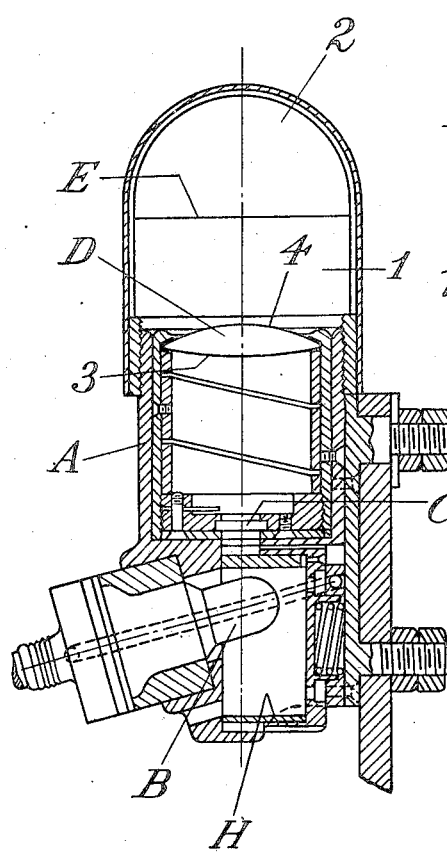
FIG: 2.
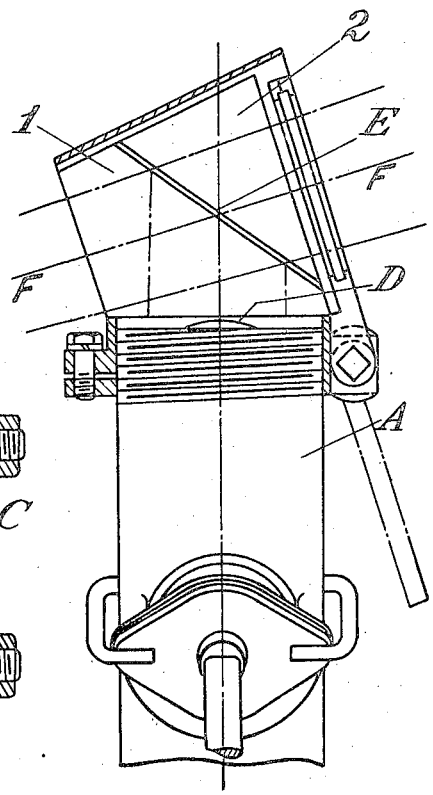
Inventor
James Weir French
per E. H. Bond
Attorney Patented Oct. 17, 1944

2,360,768

UNITED STATES PATENT OFFICE

2,360,768

GUN SIGHT

James Weir French, Anniesland, Glasgow, Scotland, assignor to Barr and Stroud, Limited, Anniesland, Glasgow, Scotland Application June 9, 1941, Serial No. 397,341
In Great Britain September 8, 1939

3 Claims. (Cl. 88—1)

This invention refers to gun sights of what may be termed the transparent reflecting screen type, i. e. sights designed to form an optical reference image in the observer's line of sight to the target by reflection of light at a transparent oblique screen through which the observer sees the target directly simultaneously with the reference image, and the invention is concerned with light collimating systems used in such sights to project light for the formation of the reference image.

In these sights, it is a matter of importance in certain circumstances to keep the length of the collimating system along its optical axis small, and for this purpose it has been necessary to use a complex lens combination to obtain suitably small values of the ratio of focal length to aperture. We have investigated this question with a view to reducing the number of lenses required to fulfill given conditions in collimating lens systems and now find it practicable to effect collimation by the use of a single lens under conditions where lens combinations have hitherto been considered necessary.

According to the present invention, there is provided in a gun sight of the type referred to, a collimating lens system consisting of a single double-convex lens having that surface which is away from the source of illumination made of aspherical form, preferably paraboloidal or approximately paraboloidal. In this way, it is possible to arrange for the lens aperture to be equal to at least half of the focal length. Thus, assuming the lens aperture to be an inch and that an image of a graticule is to be formed by the light, the graticule may be only 1.5 inches from the lens, at the focal plane of the lens, a result not believed to have been hitherto obtainable except by the use of a multiplicity of lenses.

The second surface of the lens may be spherical and the radius of curvature of the spherical surface be not less than three times and not more than six times the vertex radius of curvature of the paraboloidal surface, a lens having this characteristic forming the subject matter of a Patent No. 2,284,567 dated May 26, 1942.

The accompanying drawing illustrates one form of the invention:

Figure 1 being an elevation in section on the collimator axis, and

Figure 2 being a side elevation, partly in section, viewed at right angles relative to Figure 1.

The sight comprises a collimator tube A, a lamp B, a graticule C, a collimating lens D, and a transparent reflecting screen formed by placing two clear transparent prisms 1 and 2 close together with a sealed air space E of minute thickness between them, the screen E being oblique to the line of sight F—F from the observer to the target and oblique to the axis of the collimator.

The lens D is a double-convex lens with the surface 3 next the graticule C of spherical form and the surface 4 away from the graticule C of paraboloidal form.

Particulars of the lens are as follows:

| | |
|---|---|
| Refractive index | 1.523 |
| Radii: | |
|     Vertex curvature of paraboloid 4 | 1.920 |
|     Spherical surface 3 | 14.410 |
| Thickness | .270 |
| Aperture | 1.025 |
| Focal length | 1.481 |
| Back focus | 1.332 |

[1] Convex.

The parallel light from the lens D forms an image of the graticule C in the observer's line of sight F—F by reflection at the screen E, which image is seen simultaneously with the target for sighting purposes.

A ring H of translucent material and of varying thickness radially around its periphery is shown, the ring being rotatable about its axis around the lamp B to vary the intensity of illumination of the graticule C.

I claim:

1. A gun sight comprising a transparent screen arranged obliquely to the observer's line of sight, a graticule from which light is projected on to the screen in a lateral direction relative to the line of sight to form, by reflection at the screen, a reference image in the line of sight, and a collimating lens system through which light passes from the graticule to the screen, the collimating lens system consisting of a single double-convex lens having that surface which is away from the source of illumination made of paraboloidal form and the second surface of the lens made of spherical form with the radius of curvature of the spherical surface not less than three times and not more than six times the vertex radius of curvature of the paraboloidal surface.

2. A gun sight comprising a tubular body, assumed to be vertical, and open at its top, a transparent screen mounted on top of the tubular body obliquely to the axis thereof, a graticule within the tubular body from which light is projected through the tubular body on to the screen to form, by reflection at the screen, a reference image in the observer's line of sight which is approximately horizontal through the screen, and a collimating lens system within the tubular body between the graticule and the screen, the collimating lens system consisting of a single double-convex lens having that surface which is away from the source of illumination made of paraboloidal form and the second surface of the lens being of spherical form with the radius of curvature of the spherical surface not less than three times and not more than six times the vertex radius of curvature of the paraboloidal surface.

3. A gun sight comprising a tubular body, assumed to be vertical, and open at its top, two clear transparent prisms mounted on the tubular body and placed close together or in contact so as to form a transparent reflecting interface between them oblique to the axis of the tubular body, a graticule within the tubular body from which light is projected along the tubular body on to the screen to form, by reflection at the screen, a reference image in the observer's line of sight which is approximately horizontal through the screen, and a collimating lens system within the tubular body between the graticule and the screen, the collimating lens system consisting of a single double-convex lens having that surface which is away from the source of illumination made of paraboloidal form, the second surface of the collimating lens being spherical with the radius of curvature of the spherical surface not less than three times and not more than six times the vertex radius of curvature of the paraboloidal surface.

JAMES WEIR FRENCH.